United States Patent [19]
Addison et al.

[11] Patent Number: 5,183,995
[45] Date of Patent: Feb. 2, 1993

[54] HEAT REDUCTION LIQUID VOLUME COMPENSATOR

[76] Inventors: F. Clark Addison, 3804 W. Eisenhower Ave., Loveland, Colo. 80537; Peder J. Thorstensen, P.O. Box 1025, Loveland, Colo. 80539

[21] Appl. No.: 789,047

[22] Filed: Nov. 7, 1991

[51] Int. Cl.⁵ .................................................. H05B 3/72
[52] U.S. Cl. ................................ 219/433; 126/214 D; 219/432; 219/430
[58] Field of Search ................ 219/433, 436, 438, 499, 219/459, 456, 430, 432, 429; 126/214 D, 221, 390, 214 C, 220, 215

[56] References Cited

U.S. PATENT DOCUMENTS

| | | | |
|---|---|---|---|
| 254,141 | 2/1882 | Kenfield | 126/390 |
| 680,494 | 8/1901 | Meyer | 126/221 |
| 1,572,113 | 2/1926 | Golden | 126/221 |
| 2,142,418 | 1/1939 | Stocker | 126/214 C |
| 2,164,619 | 7/1939 | McLeod | 126/220 |
| 4,158,125 | 6/1979 | Jones | 219/433 |
| 4,164,645 | 8/1979 | Dogliotti | 219/452 |
| 4,170,931 | 10/1979 | Fajans | 99/312 |
| 4,206,341 | 6/1980 | Leuschner et al. | 219/434 |
| 4,406,942 | 9/1983 | Lo Conti | 219/434 |
| 4,772,777 | 9/1988 | Weller et al. | 219/433 |
| 4,825,046 | 4/1989 | Box | 126/221 |
| 4,896,022 | 1/1990 | Schroeder et al. | 219/433 |
| 4,927,997 | 5/1990 | Bailey | 219/459 |
| 4,994,649 | 2/1991 | Roland, Sr. et al. | 219/433 |

FOREIGN PATENT DOCUMENTS 18585 of 1907 United Kingdom ............ 126/214 C

Primary Examiner—Teresa J. Walberg
Attorney, Agent, or Firm—Fields, Lewis, Pittenger & Rost

[57] ABSTRACT

A heat reduction volume compensator for use with a drip coffee maker in which the temperature applied by a hot plate to a coffee pot is reduced as the amount of liquid in the pot decreases by means of resilient segments that lift the pot away from the hot plate as the weight of the liquid in the coffee pot decreases.

12 Claims, 4 Drawing Sheets

HEAT REDUCTION LIQUID VOLUME COMPENSATOR

TECHNICAL FIELD

This invention relates to devices for adjusting the heat applied to a liquid and more specifically to devices that reduce the heat applied to such a liquid as the amount of liquid being heated decreases.

BACKGROUND ART

Drip coffee makers have become popular in recent years. They operate by drip brewing coffee, then collecting the brewed coffee in a pot. The pot is usually built from a heat resistant material such as Pyrex. The pot sits on a hot plate or burner, which is used to heat coffee and maintain it at a drinkable temperature.

Unfortunately, the heat from a hot plate will cause evaporation from a coffee pot. As such a pot nears empty through evaporation, the coffee becomes overcooked, adversely affecting its taste. Pouring cups of coffee accelerates this. Additionally, should all moisture evaporate, the pot will burn.

Two general approaches have been tried to circumvent this problem. First, a spacer is used to separate the coffee pot from the hot plate with a blanket of air. The blanket of air acts to limit the temperature that the coffee can reach. This approach has the disadvantage of supplying too little heat when a pot is full, and too much heat when a pot is empty.

The second approach is to decrease the amount of heat being applied to a coffee pot by a hot plate, as the amount of liquid in the pot decreases. This decrease in temperature usually is based on a decrease in the weight of the pot. The problem with most of these inventions is their complexity. Invariably there are multiple moving parts.

The current invention provides a simple solution to the problem. A blanket of air can be left between a coffee pot and a hot plate or burner. The distance between the pot and plate increases as the weight of the pot decreases due to evaporation or whatever, resulting in less heat being applied to the pot by the hot plate.

The invention is significantly simpler than the other inventions that use a decrease in weight to raise a coffee pot off of a hot plate. Indeed, it is possible to construct each of the preferred embodiments disclosed herein from a single piece of metal. This simplicity has advantages in cost of manufacturing and in maintenance.

As can be seen, whereas the invention has its most immediate application when used with a drip coffee maker, it has applicability whenever a liquid (or maybe even a solid) is heated by either a hot plate or a burner.

The following is the prior art known to the inventor that might be pertinent to the patent examiner in the examination of this examination.

U.S. Pat. No. 4,158,125 by Jones describes the use of a coil spring to lift a pot off of a hot plate to reduce the heat applied to the pot as the weight of the pot decreases.

U.S. Pat. No. 4,164,645 by Dogliotti describes a device for quickly heating drinks. A Whetstone Bridge is used to set the desired temperature of the liquid being heated.

U.S. Pat. No. 4,170,931 by Fajans describes a spacer that limits direct heating of water during brewing in a percolator on a hot plate to water in a pumping assembly of the percolator.

U.S. Pat. No. 4,206,341 by Leuschner et al. describes a device that uses the rotation of a cam to move a container away from a hot plate in order to reduce the heat applied to the container.

U.S. Pat. No. 4,406,942 by Lo Conti describes a spacer consisting of a 1/16" steel wire used to control heating over a hot plate.

U.S. Pat. No. 4,772,777 by Weller et al. describes a temperature sensitive apparatus that lifts a container off of a hot plate to reduce the heat applied to the container.

U.S. Pat. No. 4,896,022 by Schroeder et al. describes a plastic carafe heated on a standard hot plate by interposing a blanket of air heated by convection. The temperature is regulated by holes.

U.S. Pat. No. 4,927,997 by Bailey describes a heat transfer pad removably mounted on a burner element.

U.S. Pat. No. 4,994,649 by Roland et al. describes a spacer ring to move a pot a constant distance from a hot plate.

DISCLOSURE OF THE INVENTION

The present invention reduces the heat applied to a fluid container as the fluid container is emptied, either by evaporation or by pouring some of the fluid from the container, and may be used to reduce the heat applied to a coffee pot by a hot plate in a coffee maker as the coffee in the coffee pot is either drunk or boiled off.

The present invention is a heat reduction volume compensator that has a generally flat disk shaped body. The compensator sits on or around a heat source such as a hot plate in a coffee maker. The compensator body is formed into a number of segments that extend upwards at a selected angle from an attached end to a free end. A fluid container such as a coffee pot sits on the free ends of the segments.

When a full container is placed on the segments, the segments are flattened due to the weight of the container and its contents. As the container is emptied, whether by drinking the liquid, or by being boiled off, the weight of the container decreases. This decrease in weight allows the segments to reclaim their original shape, lifting the container away from the heat source. This increases the distance from the heat source to the container being heated, resulting in a reduced amount of heat applied to the liquid being heated.

There are four preferred embodiments described herein. In three of the embodiments, the segments are attached to the remainder of the top surface of a compensator near the side walls, finger-like extensions projecting at an angle towards the center of the top surface. There is air flow between the finger-like segments, as well as through the center of the top surface. Additional air flow can be obtained through the use of holes added to the side walls of the compensator.

The fourth embodiment is a disk shaped body that has the segments attached to the remainder of the body on radial lines from the center of the top surface to the outer edge of the top surface. The segments are substantially circular sector in shape. There is air flow between the segments and the remainder of the top surface, as well as through additional circular sector shaped orifices placed in the top surface between segments.

BRIEF DESCRIPTION OF THE DRAWINGS

Details of this invention are described in connection with the accompanying drawings which like parts bear similar reference numerals in which.

DETAILED DESCRIPTION

Figure 1:
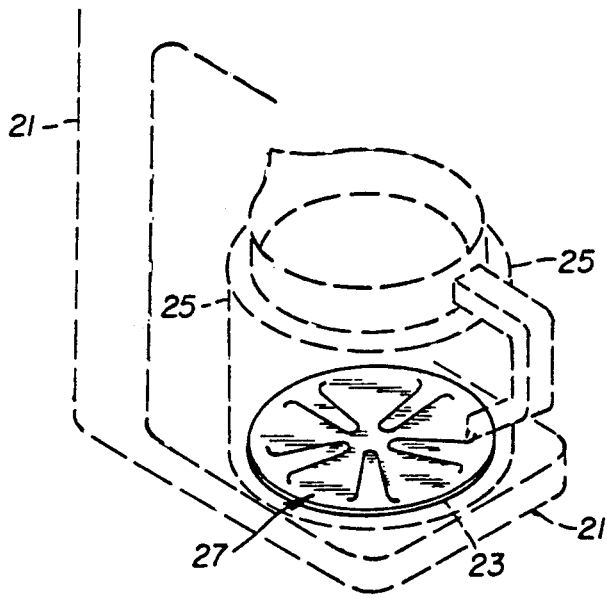
FIG. 1 is a top perspective view of the first embodiment of the invention, shown seated on a hot plate with a coffee pot thereon illustrated in dashed lines.
Figure 2:
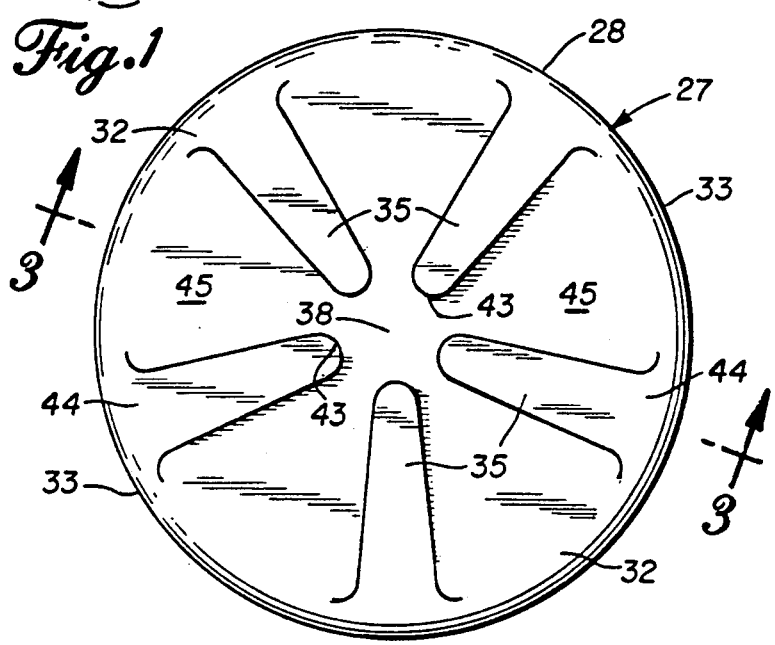
FIG. 2 is a top plan view of the first embodiment of the invention.
Figure 3:
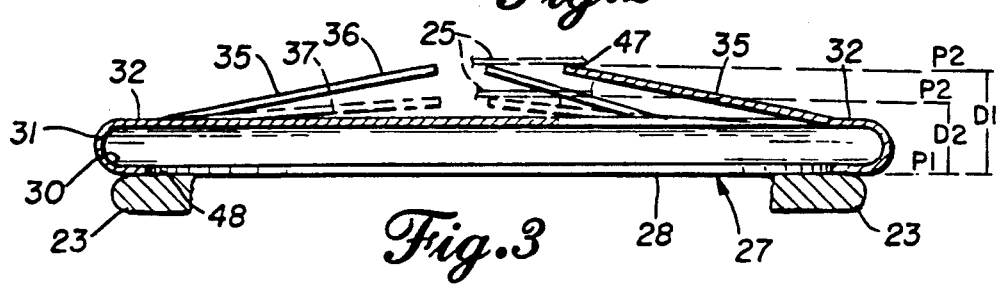
FIG. 3 is a cross sectional view of the first embodiment of the invention taken along the line 3—3 of FIG. 2.

Referring now to FIGS. 1 through 3, the first embodiment of a compensator 27 is shown. Such a compensator 27 is shown positioned over a suitable heat source such as a hot plate 23 found in a coffee maker 21. The compensator 27 is placed between the hot plate 23 and a liquid container shown here as a coffee pot 25.

The compensator 27 has a generally flat, disk shaped body 28. The body 28 is hollow, having a circular or annular side wall portion 31 and a generally flat top wall portion 32. Below the side wall portion 31, is an inturned bottom portion 30 which typically sits on the hot plate 23. The outer part of portion 32, side wall portions 31 and inturned portion 30 form a semi-circular hollow ring. The hollow feature of the body allows for air circulation between the hot plate 23 and the coffee pot 25, providing more even heating of the coffee pot.

The top wall portion 32 of the compensator 27 shown is circular in shape and has a center 38 and an outer peripheral edge 33. The top wall portion 32 is formed into several resilient segments 35. Each segment has a free end 43 and an attached end 44 attached to the remainder of the top wall portion 32. The segments 35 are bent at a selected angle away from the top wall portion 32. The selected angle is a relatively small angle and is about 10 degrees.

The bottom surface of the bottom portion 30 provides a lower contact surface portion 48 that defines a plane designated P1. The segment free ends 43 provide an upper contact surface portion 47 that define a second plane designated P2 that is substantially parallel to the first plane P1. A coffee pot can sit on the upper contact surface portion 47, while the lower contact surface portion 48 sits on the hot plate 23.

The selected angle at which the segments are bent defines an extended position 36 when there is no weight loading the upper contact surface portion 47 of the compensator. When the compensator is loaded by the weight of a coffee pot 25 and the liquid in such a pot, the distance D2 between the two planes P1,P2 defined by the contact surface portions 47,48 decreases. The amount of decrease varies depending on the weight applied to the compensator. When the weight loading the compensator is reduced, the resilience of the segments 35 causes the distance D1 between the two planes to increase, the compensator returning to its extended position 36 when the entire load is removed.

The shape of the segments in the four embodiments differ. In the first embodiment (FIGS. 1 through 3), the segments are finger-like extensions attached to the remainder of the top wall portion 32 near the outer edge 33, and extending inwardly towards, but only reaching approximately 85% of the way to, the center 38 of the top wall portion 32 of the compensator. The segments 35 are formed in the top wall portion 32 of the compensator, leaving portions of the top wall portion between each pair of adjacent segments 45. This allows significant air flow between each such pair of segments.

In the first embodiment, there are five segments 35 equally spaced around the compensator body, the center line of each segment being positioned 72 degrees from the next. The sides of the each segment are radial lines approximately 18 degrees apart, tapering slightly as the segments extend toward the center 38 of the top wall portion. The free ends 43 of the segments farthest from the attached ends 44 of said segments are rounded, approximately semi-circular in shape.

Figure 4:
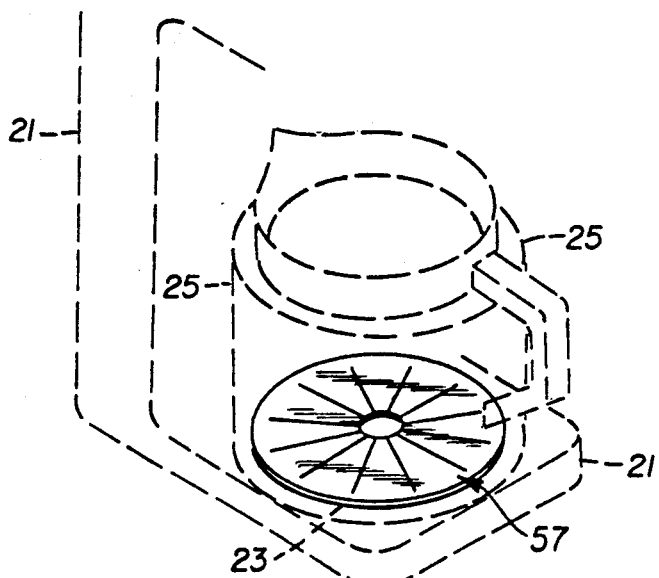
FIG. 4 is a top perspective view of the second embodiment of the invention, shown seated on a hot plate with a coffee pot thereon illustrated in dashed lines.
Figure 5:
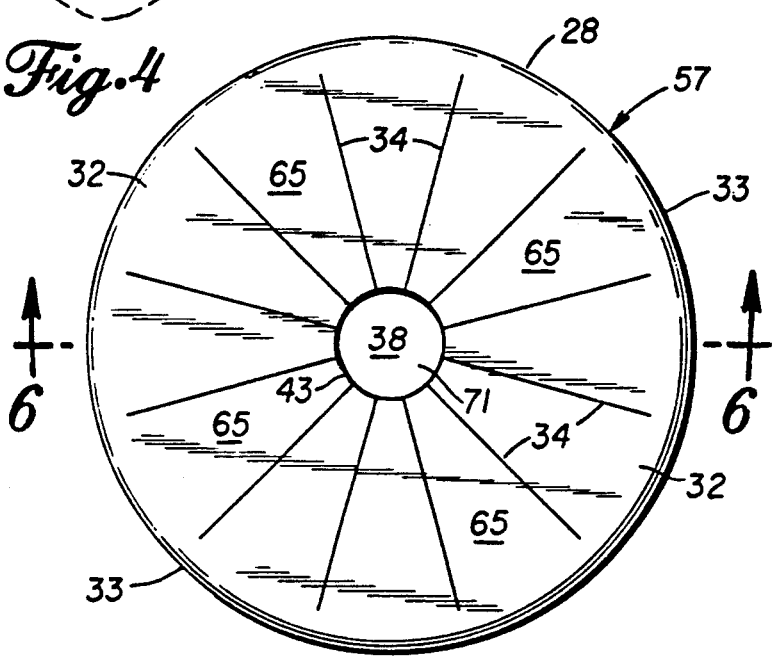
FIG. 5 is a top plan view of the second embodiment of the invention.
Figure 6:
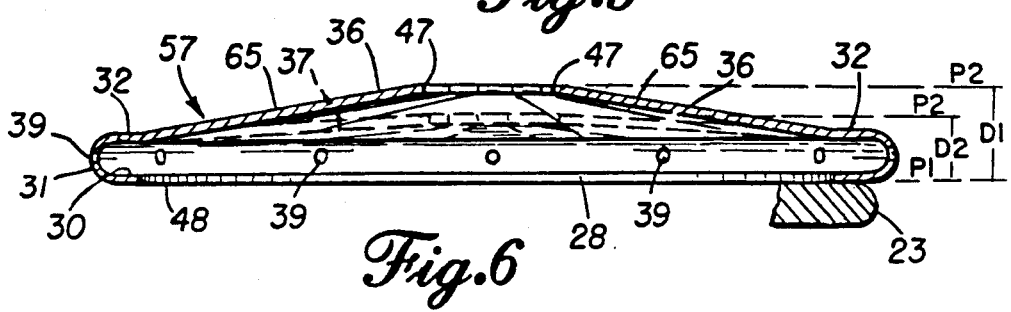
FIG. 6 is a cross sectional view of the second embodiment of the invention taken along the line 6—6 of FIG. 5.

Referring now to FIGS. 4 through 6, the second embodiment of a compensator 57 is shown. Again a compensator 57 is shown positioned over a suitable heat source such as a hot plate 23 found in a coffee maker 21. The compensator 57 is placed between the hot plate 23 and a liquid container shown here as a coffee pot 25.

The compensator 57 is similar to compensator 27 having a generally flat, disk shaped body 28. The body is hollow, having a circular or annular side wall portion 31 and a generally flat top wall portion 32. Below the side wall portion 31 is an inturned bottom portion 30 which typically sits on the hot plate 23. The hollow feature of the body allows for air circulation between the hot plate 23 and the coffee pot 25, providing more even heating of the coffee pot.

The top wall portion 32 of the compensator is circular in shape and has a center 38 and an outer edge 33. The top wall portion 32 is formed into several resilient segments 65. Each segment has a free end 43 and an attached end 44 attached to the remainder of the top wall portion 32. The segments 65 are bent at a selected angle away from the hot plate 23.

The bottom surface of the bottom portion 30 provides a lower contact surface portion 48 that defines a plane P1. The segment free ends 43 provide an upper contact surface portion 47 that defines a second plane P2 substantially parallel to the first P1. A coffee pot can sit on the upper contact surface portion 47, while the lower contact surface portion 48 sits on the hot plate 23.

The selected angle at which the segments are bent defines an extended position 36 when there is no weight loading the upper contact surface portion 48 of the compensator. When the compensator is loaded by the weight of a coffee pot 25 and the liquid in such a pot, the distance D2 between the two planes P1,P2 defined by the contact surface portions 47,48 decreases. The amount of decrease varies depending on the weight applied to the compensator. When the weight loading the compensator is reduced, the resilience of the segments 65 causes the distance D1 between the two planes to increase, the compensator returning to its extended position 36 when the entire load is removed.

The shape of the segments in the second embodiment differ from the shape in the first. In the second embodiment (FIGS. 4 through 6), the segments are finger-like extensions attached to the remainder of the top wall portion near the outer edge 33, extending inwardly towards the center 38 of the top wall portion of the compensator. There is a circular hole 71 formed around the center 38 of the top wall portion 32, said hole having a radius of approximately 16% of the radius of the top wall portion of the compensator. The segments 65 can be formed in the top wall portion 32 of the compensator, by making radial cuts in the top wall portion from near the outer edge 33 of the top wall portion inward towards the center 38, terminating in the center hole 71. The radial cuts are equally spaced, 30 degrees apart, around the top wall portion, resulting in twelve equal sized segments 65.

Additionally, holes 39 are formed in and are circumferentially spaced around the side walls 31 primarily for the purpose of increased air flow through the compensator base.

Figure 7:
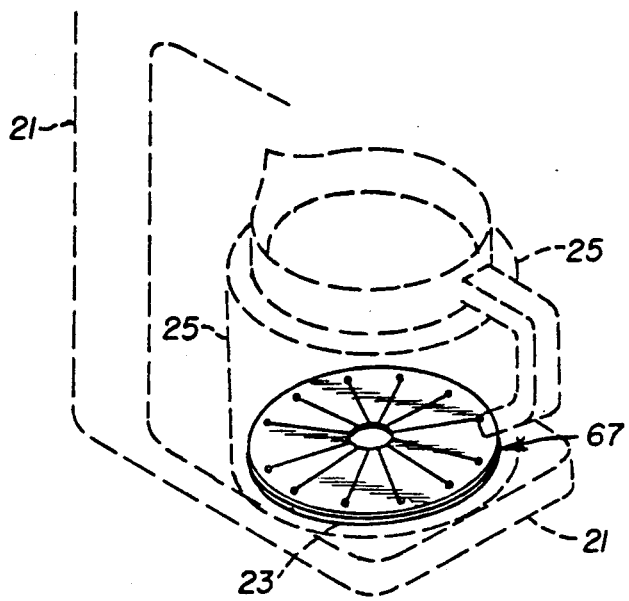
FIG. 7 is a top perspective view of the third embodiment of the invention, shown seated on a hot plate with a coffee pot thereon illustrated in dashed lines.
Figure 8:
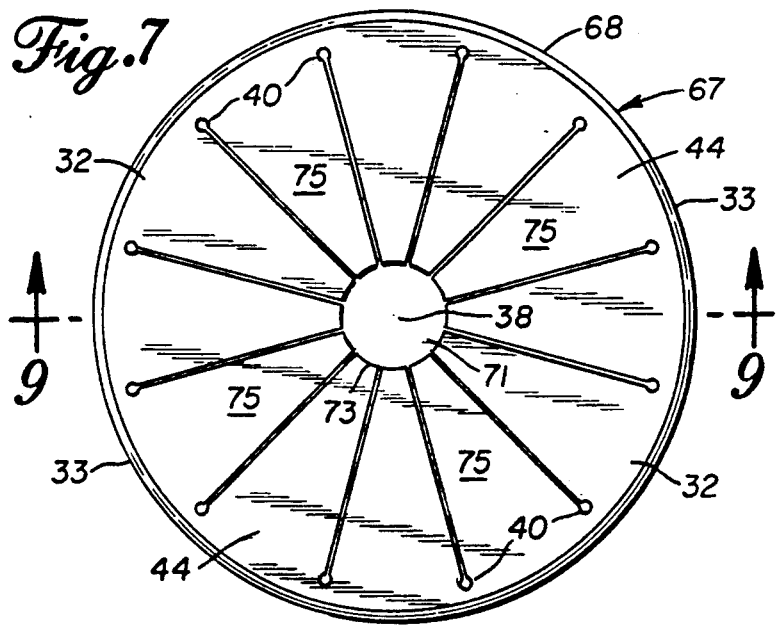
FIG. 8 is a top plan view of the third embodiment of the invention.
Figure 9:
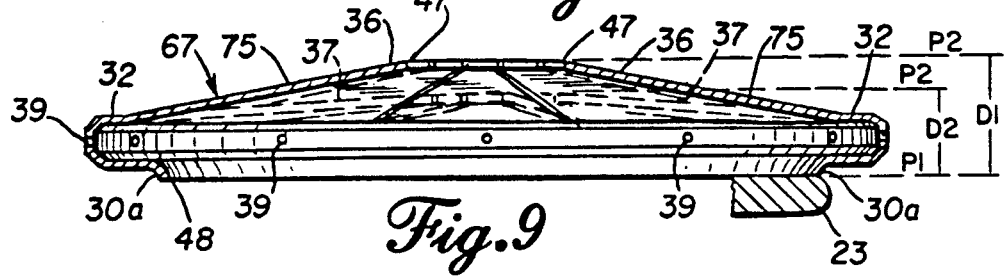
FIG. 9 is a cross sectional view of the third embodiment of the invention taken along the line 9—9 of FIG. 8.

Referring now to FIGS. 7 through 9, the third embodiment of the compensator is shown. The third embodiment is similar to the second embodiment. The third embodiment of a compensator 67 is shown positioned over a suitable heat source such as a hot plate 23 found in a coffee maker 21 The compensator 67 is placed between the hot plate 23 and a liquid container shown here as a coffee pot 25.

The compensator 67 has a generally flat, disk shaped body 28. The body is hollow, having a circular or annular side wall portion 31 and a generally flat top wall portion 32. Below the side wall portion 31 is an inturned portion that extends in and down from a bottom ring portion edge 30a which typically sits on the hot plate 23. The hollow feature of the body allows for air circulation between the hot plate 23 and the coffee pot 25, providing more even heating of the coffee pot.

The top wall portion 32 of the compensator is circular in shape and has a center 38 and an outer edge 33. The top wall portion 32 is formed into several resilient segments 75. Each segment has a free end 43 and an attached end 44 attached to the remainder of the top wall portion 32. The segments 35 are bent at a selected angle away from the hot plate 23.

The bottom edge of the ring portion 30 defines a plane P1. The segment free ends 43 define a second plane P2 substantially parallel to the first P1. The above two parts of the body defining the two planes are contact surface portions. A coffee pot can sit on the upper contact surface portion 47, while the lower contact surface portion sits on the hot plate 48.

The selected angle at which the segments are bent defines an extended position 36 when there is no weight loading the upper contact surface portion 47 of the compensator. When the compensator is loaded by the weight of a coffee pot 25 and the liquid in such a pot, the distance D2 between the two planes P1,P2 defined by the contact surface portions 47,48 decreases. The amount of decrease varies depending on the weight applied to the compensator. When the weight loading the compensator is reduced, the resilience of the segments 75 causes the distance D1 between the two planes to increase, the compensator returning to its extended position 36 when the entire load is removed.

The shape of the segments in the third embodiment is similar to the shape of the segments in the second embodiment. In the third embodiment (FIGS. 7 through 9), the segments are finger-like extensions attached to the remainder of the top wall portion 32 near the outer edge 33, and extending inwardly towards the center 38 of the top wall portion of the compensator. There is a circular hole 71 formed around the center 38 of the top wall portion, said hole having a radius of approximately 16% of the radius of the top wall portion 32 of the compensator.

The segments 75 are formed in the top wall portion 32 of the compensator, by making radial cuts in the top wall portion from near the outer edge 33 of the top wall portion inward towards the center 38, terminating in the center hole 71. The radial cuts are equally spaced, 30 degrees apart, around the top wall portion, resulting in twelve equal sized segments 75. The cuts 34 in the third embodiment are wider than those in the second embodiment to form slots of limited width, allowing some air flow between adjacent segments. Additionally, holes 40 are formed in the top wall portion 32 at the outermost end of the cuts 34, resulting in additional air flow through the top wall portion of the compensator.

Additionally, holes 39 are formed in and are circumferentially spaced around the side wall portion 31 primarily for the purpose of increased air flow through the compensator base.

Figure 10:
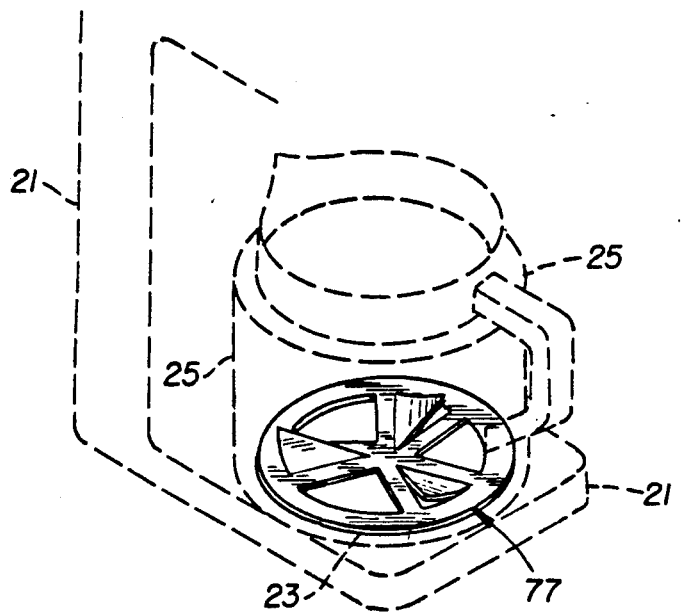
FIG. 10 is a top perspective view of the fourth embodiment of the invention, shown seated on a hot plate with a coffee pot thereon illustrated in dashed lines.
Figure 11:
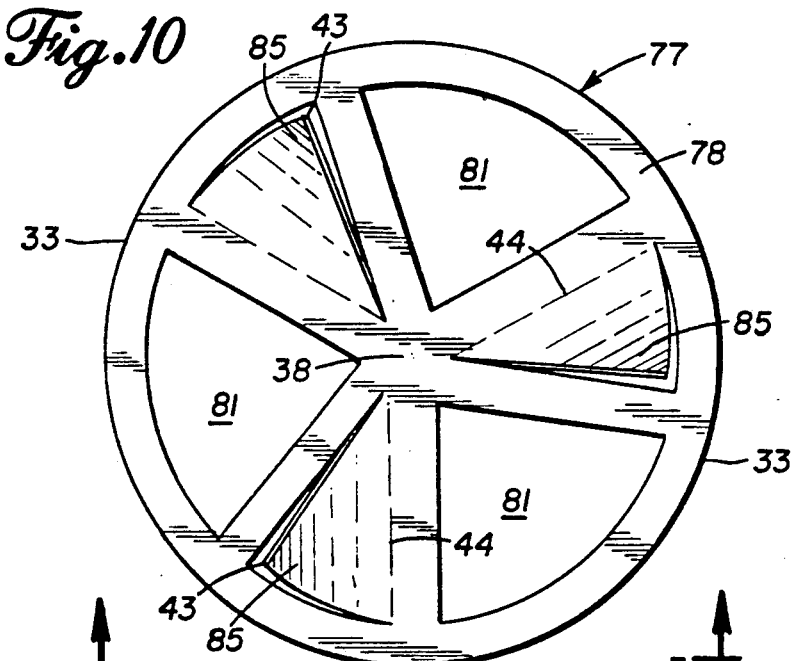
FIG. 11 is a top plan view of the fourth embodiment of the invention.
Figure 12:
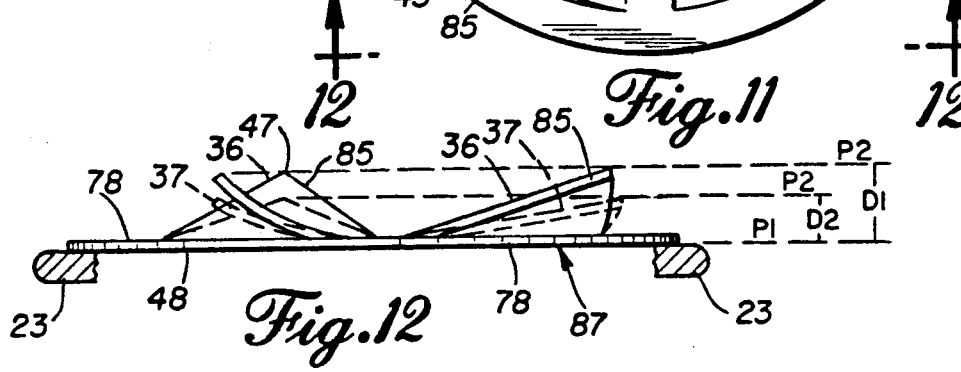
FIG. 12 is a side elevation view of the fourth embodiment of the invention taken along the line 12—12 of FIG. 11.

Referring now to FIGS. 10 through 12, the fourth embodiment of a heat reduction liquid volume compensator 77 is shown. Such a compensator 77 is shown positioned over a suitable heat source such as a hot plate 23 found in a coffee maker 21. The compensator 77 is placed between the hot plate 23 and a liquid container shown here as a coffee pot 25.

The compensator 77 is generally circular in shape and is placed on the hot plate 23. It has a generally flat disk shaped body 78 that has a center 38 and an outer edge 33. The body is formed with several resilient segments 75. Each segment has a free end 43 and an attached end 44 attached to the remainder of the body. The segments 75 are bent at a selected angle away from the remainder of the body.

The planar or flat bottom surface of the body 78 provides a lower contact surface portion 48 that defines a plane P1. The segment free ends 43 provide an upper contact surface portion 47 that define a second plane P2 substantially parallel to the first plane P1. A coffee pot can sit on the upper contact surface portion 47, while the lower contact surface portion 48 sits on the hot plate 23. Note that this embodiment allows the compensator to operate successfully inverted, with a coffee pot 25 on the contact surface portion 48, while the contact portion 47 sits on the hot plate 23.

The selected angle at which the segments are bent defines an extended position 36 when there is no weight loading the contact surface portion 48 of the compensator. When the compensator is loaded by the weight of a coffee pot 25 and the liquid in such a pot, the distance D2 between the two planes P1,P2 defined by the contact surface portions 47,48 decreases. The amount of decrease varies depending on the weight applied to the compensator. When the weight loading the compensator is reduced, the resilience of the segments 85 causes the distance D1 between the two planes to increase, the compensator returning to its extended position 36 when the entire load is removed.

In this embodiment, the segments 85 are substantially circular sector shaped. The segments are attached to the remainder of the body along an radial line from the center 38 of the body to the outer edge 33 of the body. Each pair of adjacent segments 85 is separated from each other by a substantially circular sector shaped orifice or hole 81 cut into the body 78 of the compensator.

There are three segments evenly spaced around the body of the compensator. The radial lines describing the attached end 44 of each of the segments are each 120 degrees from the other two such lines. Each circular sector shaped segment is approximately 35 degrees wide. The circular sector shaped holes separating the three segments are approximately 75 degrees wide.

Air flow assists in reducing the heat applied to the liquid container 25 by the heat source 23. In the first embodiment (FIG. 1 through 3), the segments 35 are not contiguous Air flow is thus possible between the segments 35. In the second (FIGS. 4 through 5) and third (FIGS. 6 through 9) embodiments, the resilient segments 65 are essentially contiguous around the top wall portion 33 of the compensator. There is minimal air flow between adjacent segments 65. Air flow is possible through the center 38 of the body. Additional air flow is available in the third implementation (FIGS. 6 through 9) by use of holes 40 in the top wall portion 33 in the outside ends of the cuts 34 between adjacent segments. Additional air flow results from venturi holes 39 in the side walls 31.

The shape of the segments 35 in the fourth embodiment (FIGS. 10 through 12), allows air to flow through the body portion of the compensator 33, between segments 85 and the liquid container 25. Additional air flow is provided by placing circular sector shaped orifices 41 between segments 85. It is understood that in this embodiment the slits can be widened to slots like that shown in FIG. 8. It if further understood that other than circular shapes such as square or rectangular could be used.

The above described compensators can be formed of relatively thin sheet material, such as stainless steel or molded in plastic. In each case the material has a memory or resilience to return to the extended position once the weight is removed.

Although the present invention has been described with a certain degree of particularity, it is understood that the present disclosure has been made by way of example and that changes in details of structure may be made with out departing from the spirit thereof.

What is claimed is:

1. A heat reduction liquid volume compensator comprising:
    a body adapted to seat over a heat source and carry the weight of a fluid container,
    said body having a plurality of circumferentially spaced resilient segments, each said segment having an attached end and a free end,
    said body defining two oppositely facing contact surface portions disposed in substantially parallel spaced planes in an extended position, at least one of said planes being defined by said free ends, and
    said contact surface portions being movable in relation to each other, the spacing between said contact surface portions decreasing in response to the weight of said container, and the resilience of said segments causing said contact surface portions to return automatically to said extended position when said weight is removed, the resilience of the segments being sufficient to cause the spacing between said contact surface portions to increase sufficiently to result in a reduction of heat applied to said container by said heat source as the amount of liquid in said container is reduced.

2. A heat reduction liquid volume compensator as described in claim 1 wherein said body has a fixed portion and a movable portion, said fixed portion being a generally circular disk shape, and said movable portion being formed by said segments.

3. A heat reduction liquid volume compensator as described in claim 2 wherein each said segment is substantially a circular sector shape and each said attached end is disposed along a radial line extending from a center to an outer edge of the circular portion of said body.

4. A heat reduction liquid volume compensator as described in claim 3 wherein said segments are separated from each other by a plurality of substantially circular sector shaped orifices which provide additional air flow through said body.

5. A heat reduction liquid volume compensator as described in claim 2 wherein said segments are fingerlike, extend generally radially inwardly from an outer edge toward a center, and are separated from each other by portions of said body.

6. A heat reduction liquid volume compensator as described in claim 2 wherein said body has a circular aperture around the center of said body and wherein said segments are formed by cuts that extend generally radially inwardly from an outer edge toward said center, ending at said aperture.

7. A heat reduction liquid volume compensator as described in claim 6 wherein said cuts are wide enough to allow air flow between adjacent segments.

8. A heat reduction liquid volume compensator as described in claim 6 wherein holes are formed in said body at the outer end of said cuts, said holes being large enough to allow air flow through said body.

9. A heat reduction liquid volume compensator as described in claim 2 having an annular skirt portion, the lower edge of said skirt portion forming one contact surface portion, the upper edge of said skirt portion being attached to an outer peripheral edge of said fixed portion, and said skirt portion providing an air space between said body and said heat source.

10. A heat reduction liquid volume compensator as described in claim 9 wherein said skirt portion has an upper portion adjacent to said upper edge and a lower portion adjacent to said lower edge, said lower portion being ring shaped and having a lesser diameter than said upper portion.

11. A heat reduction liquid volume compensator as described in claim 9 wherein said skirt portion has a plurality of circumferentially spaced holes which provide a venturi effect.

12. A heat reduction liquid volume compensator for reducing the heat applied to a fluid container by a heat source as the fluid container is emptied of a contained quantity of heated liquid, said compensator comprising:

a disk shaped body adapted to seat over said heat source and carry the weight of said fluid container, said body being formed with a plurality of circumferentially spaced resilient segments, each said segment having an attached end and a free end, said free ends being disposed a selected distance above a plane that includes said attached ends, said free ends being movable toward said plane in response to said weight being applied to said free ends, and said free ends supporting said fluid container with said segments being lowered to a position closer to said heat source under said weight and the resilience of said segments causing said fluid container to rise away from said heat source as said fluid container is emptied of said heated liquid a distance sufficient to result in the reduction of the heat applied to said container by said heat source.

* * * * *